US009804018B1

(12) United States Patent
Muccillo

(10) Patent No.: US 9,804,018 B1
(45) Date of Patent: Oct. 31, 2017

(54) LUGGAGE CART WEIGHING APPARATUS

(71) Applicant: Steven Richard Muccillo, Albuquerque, NM (US)

(72) Inventor: Steven Richard Muccillo, Albuquerque, NM (US)

(*) Notice: Subject to any disclaimer, the term of this patent is extended or adjusted under 35 U.S.C. 154(b) by 0 days.

(21) Appl. No.: 15/237,237

(22) Filed: Aug. 15, 2016

(51) Int. Cl.
*B62B 1/10* (2006.01)
*G01G 19/414* (2006.01)
*G01G 19/52* (2006.01)
*G08B 21/18* (2006.01)
*B62B 3/00* (2006.01)

(52) U.S. Cl.
CPC ........... *G01G 19/414* (2013.01); *G01G 19/52* (2013.01); *G08B 21/182* (2013.01); *B62B 3/005* (2013.01)

(58) Field of Classification Search
CPC ............ B62B 1/10; B62B 1/266; B62B 3/002
USPC ....................... 340/666; 280/47.35, 651, 652
See application file for complete search history.

(56) References Cited

U.S. PATENT DOCUMENTS

| 3,937,287 | A | * | 2/1976 | Pryor | G01G 23/163 177/25.15 |
| 5,823,278 | A | * | 10/1998 | Geringer | G01G 19/445 177/144 |
| 2002/0113715 | A1 | * | 8/2002 | Wilson | G01B 5/02 340/815.45 |
| 2004/0140136 | A1 | * | 7/2004 | Simons | G01G 19/083 177/140 |
| 2007/0095123 | A1 | * | 5/2007 | Aikawa | G01G 23/10 73/1.35 |
| 2008/0014066 | A1 | * | 1/2008 | Kolesa | B62B 3/08 414/469 |

* cited by examiner

*Primary Examiner* — Kevin Kim
(74) *Attorney, Agent, or Firm* — Stetina Brunda Garred and Brucker

(57) ABSTRACT

A luggage cart weighing apparatus includes a luggage platform, a plurality of wheels for supporting the platform, one or more weight measuring devices, and a user interface. The one or more weight measuring devices are disposed intermediate the second surface of the platform and at least one wheel of the plurality of wheels. The user interface is disposed adjacent the platform. The user interface is in electrical communication with the one or more weight measuring devices for providing information concerning a weight of one or more items loaded onto the platform.

23 Claims, 4 Drawing Sheets

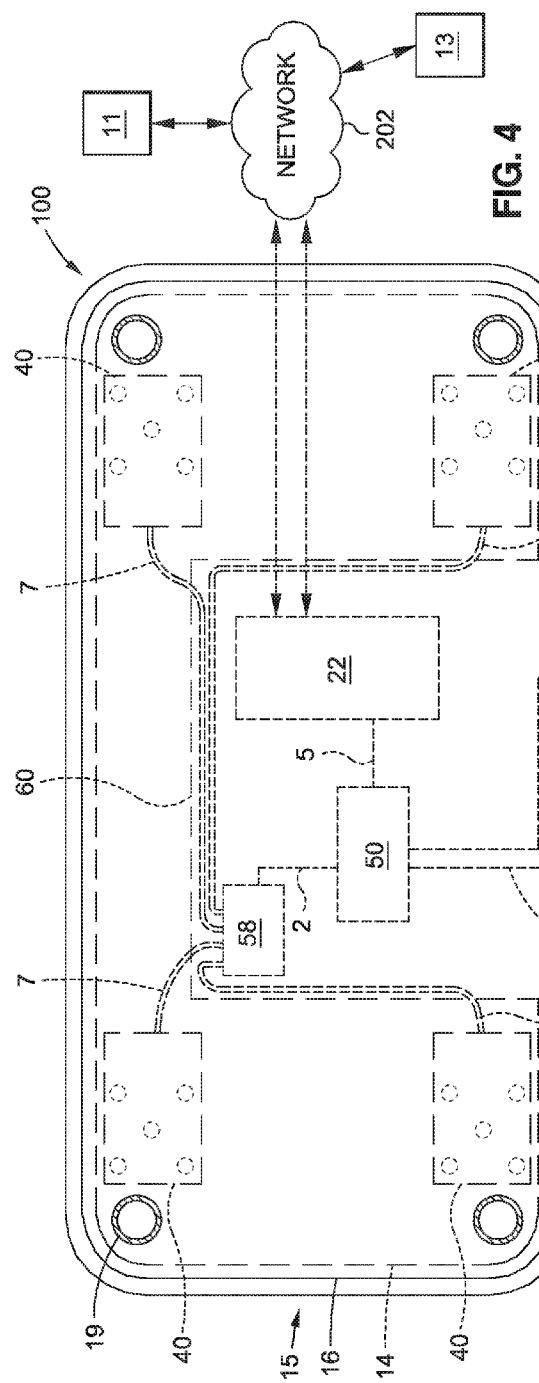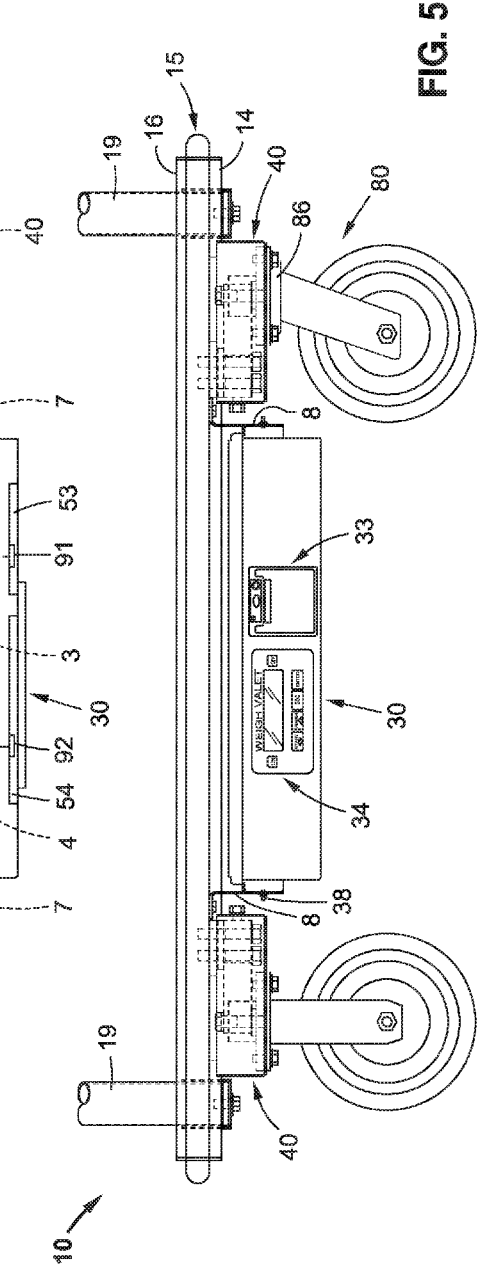
FIG. 4
FIG. 5

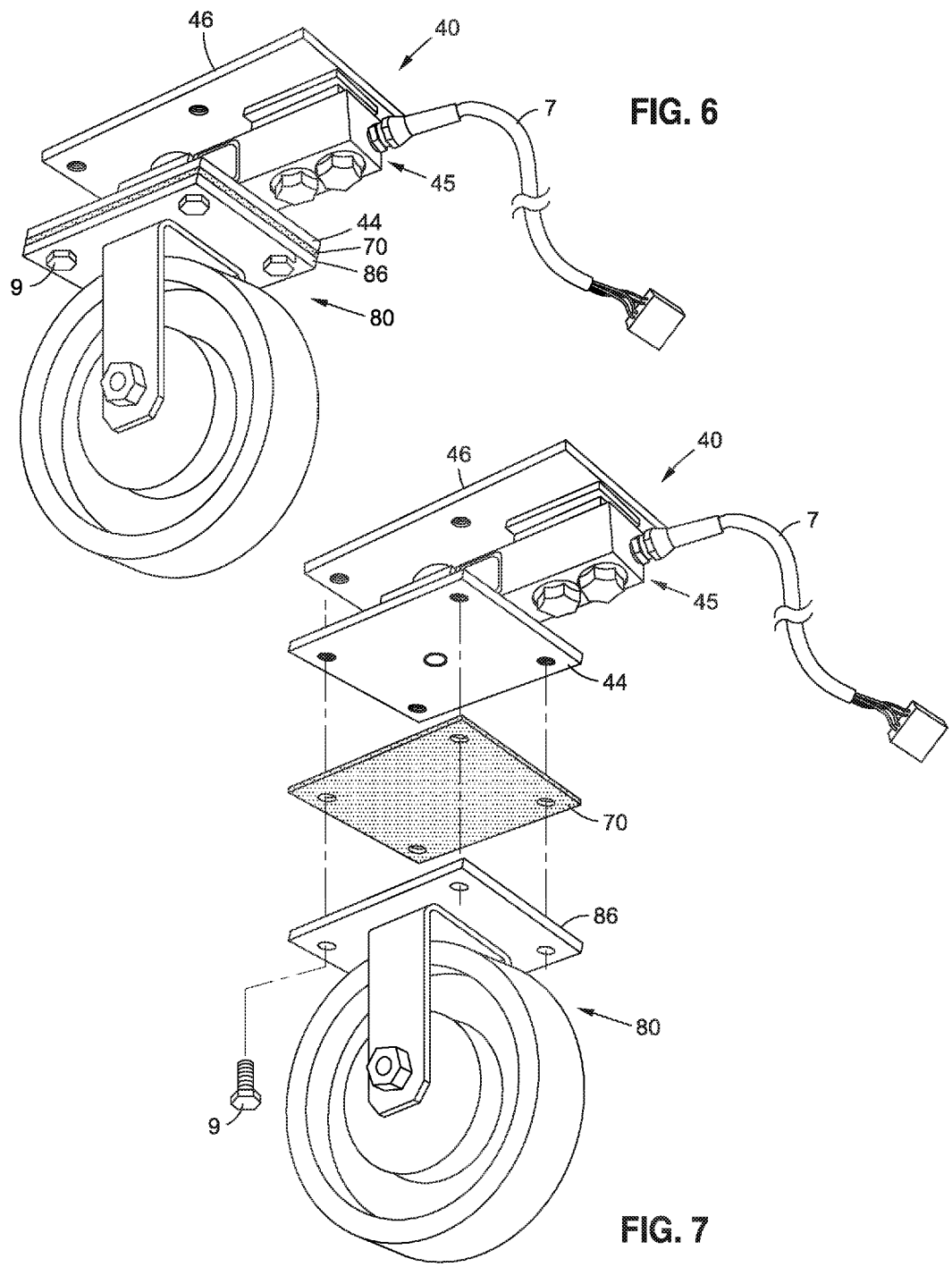

LUGGAGE CART WEIGHING APPARATUS

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field

The present disclosure relates to apparatus for weighing articles. More particularly, the present disclosure relates to a luggage cart weighing apparatus.

Discussion of Related Art

Oversized luggage does not fit within the maximum allowable dimensions set forth by a transportation provider. The term most often refers to luggage checked for air travel, but can also apply to air travel carry-on bags and to luggage transported by bus, train, or ship. The designation "oversized" typically refers to the actual outer dimension of the luggage rather than its weight. Bags that weigh more than the maximum allowable weight are generally designated "overweight." Some transportation providers strictly forbid passengers to carry oversized or overweight luggage, while others will allow it upon payment of an additional fee.

The ability to easily and accurately measure the weight of luggage has taken on increased importance for both travelers and transportation providers including airlines and surface transport networks, consisting of trains, buses and the like. In the aviation mode of transportation, for example, stricter airline policies have meant that for persons involved in the handling of luggage there must be an increased awareness of both weight and security of luggage transportation.

In air travel, all checked items are weighed by the airline. For some airlines, a safety requirement has been introduced restricting the weight of each single item of luggage, as a measure to reduce strains and injuries among luggage handling staff. If the weight of any piece of luggage should exceed the weight limit, the passenger is informed at check-in. Most airlines typically impose a fee for each piece over the limit. At the same time, most airlines limit the maximum weights and numbers of free allowed checked-in luggage. For instance, if the number of pieces is over the limit but their total weight is within the limits, a fee is imposed for each extra piece. To avoid any fees, passengers often must redistribute some of the contents of their luggage to another suitcase, or else carry it on. Airlines typically limit passenger carry-on bag size. Weight of carry-on bags becomes particularly important on flights outside the United States, where carry-on weight is usually taken into account. However, variables such as the aircraft used and passenger load may affect the size and weight of carry-on bags allowed on an airplane.

In general, each airline sets its own policies as to what constitutes overweight or oversized luggage and sets policies and fees regarding the ability of customers to check or carry such bags. Airlines may also have different restrictions based on geography and on specific flights. The maximum allowable dimensions and weight and the oversize/overweight luggage fees may differ from one country to another as well. Such luggage could be banned entirely on some flights and merely incur an additional fee on others.

From the passenger's perspective, to avoid an excess weight charge at a typical airport check-in, the passenger must either find a way to reduce the weight and contents of the luggage, perhaps by opening bags and repacking items, or pay for an additional piece of luggage. With strict airport security measures, and concomitant time constraints, passengers faced with the dilemma of excess luggage weight have been known to miss a scheduled flight and, as a result, suffer even greater inconvenience and expense.

In some cases, a traveler may check with an airline before packing for travel to determine the airline's weight allowance for checked luggage and/or carry-on guidelines regarding the number of pieces that may be carried on and the maximum size of those pieces. Often travelers must pack their luggage only being able to guess what the actual weight of the packed piece of luggage will be. This can result in an uncomfortable, embarrassing, and time-consuming situation when the traveler arrives at the airport and finds out that his/her luggage exceeds the weight limit. Airlines typically allow customers to redistribute the weight into other luggage. This process of redistributing the contents between luggages, however, can result in delayed check-in for others waiting in line behind the traveler whose luggage exceeds the allowable weight.

For many travelers, it would be advantageous to know the weight of their luggage prior to arriving at their point of departure. A need exists for a convenient way by which a traveler can weigh his/her luggage to make sure that it meets the requirements of luggage weight restrictions before it is taken to the airport or location for transport.

BRIEF SUMMARY

According to an aspect of the present disclosure, a luggage cart weighing apparatus may comprise a luggage platform, a plurality of wheels for supporting the platform, one or more weight measuring devices, and a user interface. The one or more weight measuring devices may be disposed intermediate the second surface of the platform and at least one wheel of the plurality of wheels. The user interface may be disposed adjacent the platform. The user interface may be in electrical communication with the one or more weight measuring devices for providing information concerning a weight of one or more items loaded onto the platform.

The weight measuring devices may be strain gauge load cells. The strain gauge load cells may be configured to have matched load output characteristics.

The user interface may include a display for indicating the weight of items loaded onto the platform. The user interface may also include a printer for printing information concerning the weight of items loaded onto the platform.

The luggage cart weighing apparatus may further include a processor in communication with measuring devices and the user interface. The luggage cart weighing apparatus may further include a local wireless communication circuit, in communication with the processor, for communicating information indicating the weight of items loaded onto the platform to a mobile communication device.

The luggage cart weighing apparatus may further include a local wireless communication circuit in communication with the processor, for communicating airline luggage allowance information to the processor. The local wireless communication circuit may further communicate guest flight reservation information from a mobile communication device to the processor. The processor may be operative to compare the guest flight reservation information to the airline luggage allowance information to derive flight specific luggage allowance for a specific flight booked by a guest. The processor may further be operative to indicate if the weight of an item loaded onto the platform exceeds the flight specific luggage allowance.

The luggage cart weighing apparatus may further include a summing circuit having a plurality of inputs, each input being in electrical communication with an associated weight measuring device, and an output connected to the processor. The summing circuit may be configured to output a signal indicative of the total load applied to the platform.

The luggage cart weighing apparatus may further include a plurality of tubular frame members mechanically connected to and extending upwardly from the platform.

According to another aspect of the present disclosure, a luggage cart weighing apparatus may comprise: a platform, which includes a first surface and a second surface in opposed relation to one another; a plurality of tubular frame members extending upwardly from the first surface of the platform; a plurality of weight measuring devices; a plurality of wheels connected to and supporting the platform; and a user interface. Each weight measuring device may include a top plate, a base plate, and a load sensor operably coupled to both the top plate and the base plate. The top plate of each weight measuring device may be attached to the second surface of the platform. Each wheel includes a wheel plate. Each of the plurality of wheels may be attached to an associated weight measuring device base plate. An electrically non-conductive, abrasion-resistant material may be situated between the wheel plate and the base plate. The user interface may be disposed adjacent the second surface of the platform for providing information concerning a weight of luggage loaded onto the first surface of the platform. The user interface may be communicatively coupled with the plurality of weight measuring devices.

BRIEF DESCRIPTION OF THE DRAWINGS

These and other features and advantages of the various embodiments disclosed herein will be better understood with respect to the following description and drawings, in which like reference numerals may refer to similar or identical elements throughout the description of the figures, and in which:

FIG. 4 is a plan view of the luggage cart weighing apparatus taken along section lines 4-4 of FIG. 2 in accordance with an embodiment of the present disclosure;

FIG. 5 is a side view of the luggage cart weighing apparatus of FIG. 4, with parts thereof in phantom lines, in accordance with an embodiment of the present disclosure;

FIG. 6 is a perspective view of an embodiment of a weight measuring device and a wheel in an assembled configuration in accordance with the present disclosure; and FIG. 7 is a perspective view of the weight measuring device and the wheel of FIG. 6, with parts separated, in accordance with an embodiment of the present disclosure.

DETAILED DESCRIPTION

Figure 1:
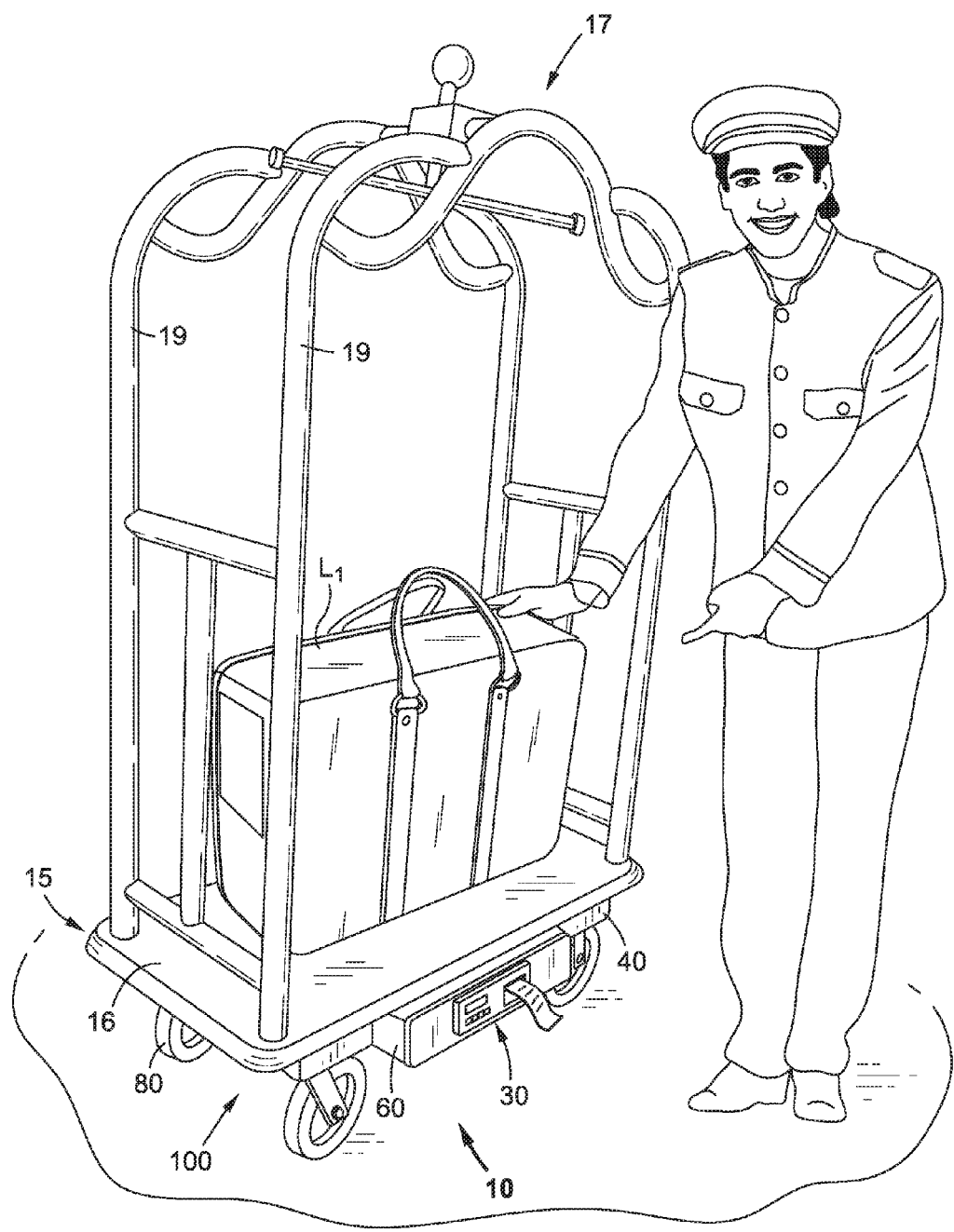
FIG. 1 is a perspective view illustrating the operation of a luggage cart weighing apparatus in accordance with an embodiment of the present disclosure.

Hereinafter, embodiments of a luggage cart weighing apparatus are described with reference to the accompanying drawings.

This description may use the phrases "in an embodiment," "in embodiments," "in some embodiments," or "in other embodiments," which may each refer to one or more of the same or different embodiments in accordance with the present disclosure.

As it is used herein, the term "luggage" generally refers to bags and suitcases with their contents, trunks, and other such travel-specific bags, cases, or equipment including musical equipment, strollers, wheelchairs, and anything else that is checked or carried on.

As it is used herein, the term "computer" generally refers to anything that transforms information in a purposeful way. In this description, the terms "software" and "code" may be applicable to software, firmware, or a combination of software and firmware. As it is used herein, the term "controller" may include any type of computing device, computational circuit, or any type of processor or processing circuit capable of executing a series of instructions that are stored in a memory. As it is used in this description, "printed circuit board" (or "PCB") generally refers to systems that provide, among other things, mechanical support to electrical devices and/or components, electrical connection to and between these electrical components, combinations thereof, and the like. The present disclosure may employ various integrated circuit components, e.g., memory elements, processing elements, logic elements, look-up tables, and the like, which may carry out a variety of functions under the control of one or more controllers, processors and/or other control devices.

As it is used herein, the term "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.).

As used herein, the terms "power source" and "power supply" refer to any source of electrical power, e.g., electrical outlet, a/c generator, battery or battery pack, etc. As it is used in this description, "transmission line" generally refers to any transmission medium that can be used for the propagation of signals from one point to another. A transmission line may be, for example, a wire, two or more conductors separated by an insulating medium, a fiber optic line and/or fiber optic bundles. As it is used in this description, "user interface" generally refers to any visual, graphical, tactile, audible, sensory or other mechanism for providing information to and/or receiving information from a consumer or other entity. The term "user interface" as used herein may refer to an interface between a human user and one or more devices to enable communication between the user and the device(s). As it is used in this description, "switch" or "switches" generally refers to any electrical actuators, mechanical actuators, electro-mechanical actuators (rotatable actuators, pivotable actuators, toggle-like actuators, buttons, etc.), optical actuators, or any suitable device that generally fulfills the purpose of connecting and disconnecting electronic devices, or component thereof, instruments, equipment, transmission line or connections, or software.

Various embodiments of the present disclosure provide a weighing apparatus for weighing articles, such as for example, luggage. Embodiments of the presently-disclosed weighing apparatus may be operably coupled to items found in hotels and/or hotel rooms, e.g., hotel bell captain carts, luggage racks, and/or ironing boards. Embodiments of the presently-disclosed weighing apparatus may be mobile, portable, or stationary apparatus.

Various embodiments of the present disclosure provide a luggage cart weighing apparatus including a user interface operably associated therewith. Embodiments of the presently-disclosed luggage cart weighing apparatus provide a way for hotel guests, or hotel personnel, to obtain weigh information for luggage, e.g., to allow travelers to avoid excess weight fees and/or ensuring a carefree journey, which, in turn, may enhance the hotel's reputation and boost positive reviews. Component parts of the presently-disclosed luggage cart weighing apparatus may be provided as an after-market product to be installed to a hotel bell captain cart or the component parts may be installed at the time of the original manufacture of the hotel bell captain cart.

Various embodiments of the present disclosure provide a weighing system that includes a luggage cart weighing apparatus and a software application configured to request and receive data from transportation providers, e.g., airlines websites, to obtain current information on luggage allowance policies that apply for a traveler's itinerary, e.g., based on operating carrier, origin and destination airports. The presently-disclosed weighing system is intended and designed to allow hotels to offer services to travelers, such as for example, texted messages concerning compliance (or non-compliance) of the traveler's luggage with weight restrictions. The presently-disclosed weighing system software application may include executable instructions of a web browser application that are loaded on a computer in a hotel guest's room, business center, lobby and/or other hotel computer(s) and/or downloadable to the hotel guest's personal computing device, e.g., laptop computer, tablet device, smart phone, etc. It is contemplated that the web browser application communicates with various web servers over the hypertext transfer protocol (HTTP) to request and receive data, e.g., information on a specific carrier's luggage allowance policies based on flight number, plane type, etc.

One or more elements of the presently-disclosed weighing system software application can be implemented in the form of a computer product including a computer readable storage medium with computer usable program code for performing the method steps indicated. As used herein, "computer-readable medium" generally refers to any storage device used for storing data accessible by a computer. "Non-transitory" computer-readable medium include all computer-readable medium, with the sole exception being a transitory, propagating signal. Examples of a computer-readable medium may include: a magnetic hard disk; a floppy disk; a random access memory (RAM); an erasable programmable read-only memory (EPROM); an optical disk, such as a portable compact disc read-only memory (CD-ROM); a magnetic tape; a magnetic device; a flash removable memory; a memory chip; and/or other types of media that may store machine-readable instructions thereon. Those skilled in the art will recognize that a memory may include or be in communication with a cache (also referred to as a "cache memory"), for buffering "write data" and "read data," which respectively refer to write/read requests and their associated data.

Figure 2:
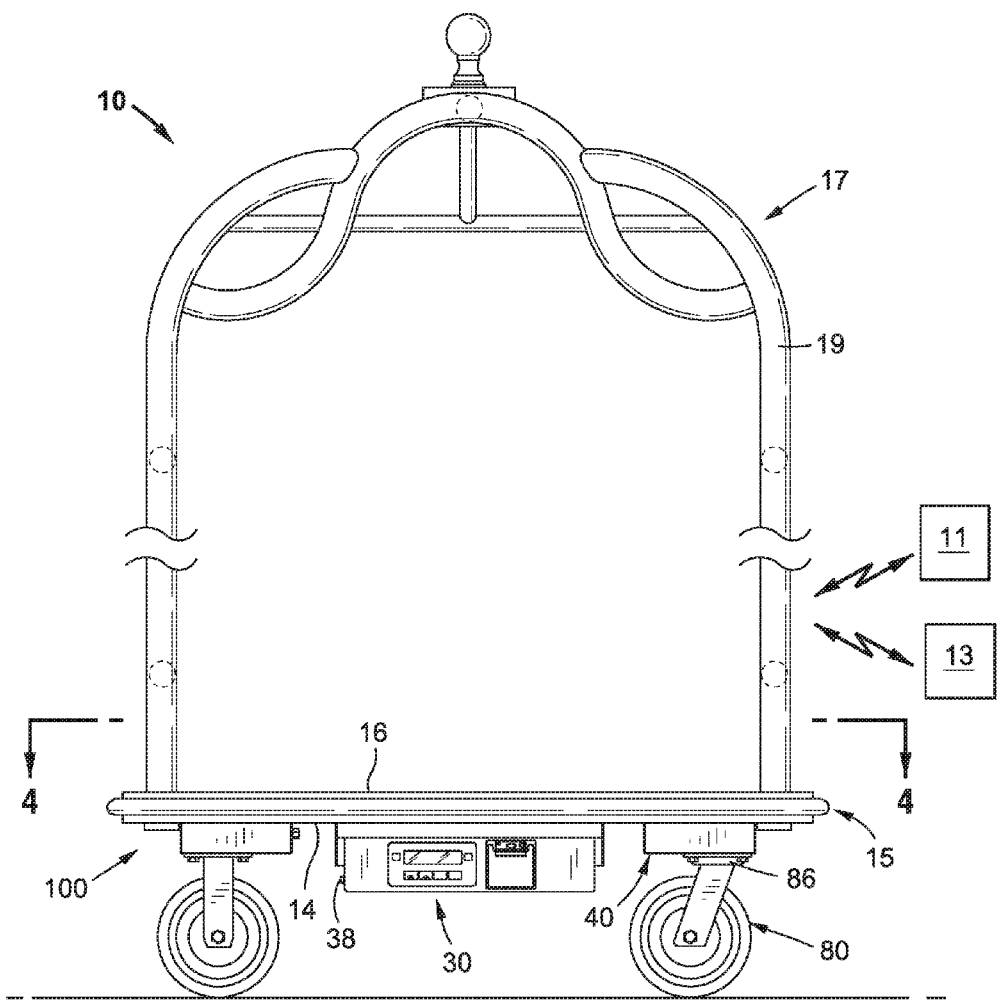
FIG. 2 is a perspective view of the luggage cart weighing apparatus of FIG. 1, shown without luggage, in accordance with an embodiment the present disclosure.

The presently-disclosed luggage cart weighing apparatus is referred to generally in FIGS. 1, 2 and 5 by the reference numeral 10 and is intended to provide a combined luggage cart and weighing apparatus including a user interface operably associated therewith. It is to be understood that the luggage cart weighing apparatus 10 may be used to weigh all types of articles and should not be construed to be limited to only luggage.

In FIGS. 1 and 2, an embodiment of a luggage cart weighing apparatus (generally referred to herein as weighing apparatus 100) is shown for weighing various articles, e.g., luggage $L_1$ shown in FIG. 1. In the embodiment illustrated in FIG. 1, the weighing apparatus 100 is operably associated with a hotel bell captain cart 17. The weighing apparatus 100 generally includes one or more weight measuring devices 40. An example of a weight measuring device 40 is shown in FIGS. 6 and 7. In the embodiment illustrated in FIGS. 1 and 2, the weighing apparatus 100 includes four weight measuring devices 40. It is to be understood that the weighing apparatus 100 may be utilized with a variety of hotel (or non-hotel) items and should not be construed to be limited to only hotel bell captain carts.

The hotel bell captain cart 17 generally includes a rigid platform 15 constructed to carry a heavy load, a plurality of tubular frame members 19 mechanically connected to and extending upwardly from the platform 15, and a plurality of wheels 18. The platform 15 includes a top surface (also referred to herein as a first surface) 16 and a bottom surface (also referred to herein as second surface) 14, and may include a 180° perimeter bumper. In some embodiments, the platform 15, the top surface 16 and the bottom surface 14 are integrally formed as a single unitary body. In other embodiments, the top surface 16 and/or the bottom surface 14 may be provided as a separate component. In an embodiment, the tubular frame members 19 are heavy-duty polished tubular stainless steel. It is to be understood that the number, size, shape, and the relative positions of the tubular frame members 19 may be varied from the configuration shown in FIGS. 1, 2 and 4.

A variety of commercially available wheels may be suitable for use as the wheels 80. In some embodiments, as shown for example in FIGS. 1, 2 and 5, the four wheels 80 include two rigid plate caster wheels and two swivel plate caster wheels. In the embodiment illustrated in FIGS. 1, 2 and 5, each of the weight measuring devices 40 is operably coupled between the bottom surface 14 of the platform 15 and the plate mount 86 of a wheel 80, e.g., as shown in FIGS. 2 and 5. In an embodiment, the caster wheels 80 are heavy-duty non-marking caster wheels with chrome finished parts. While four wheels are shown, proximate each of the four corners, it is to be understood that the number and location of wheels may be varied from the configuration depicted in FIGS. 1, 2 and 5.

Figure 3:
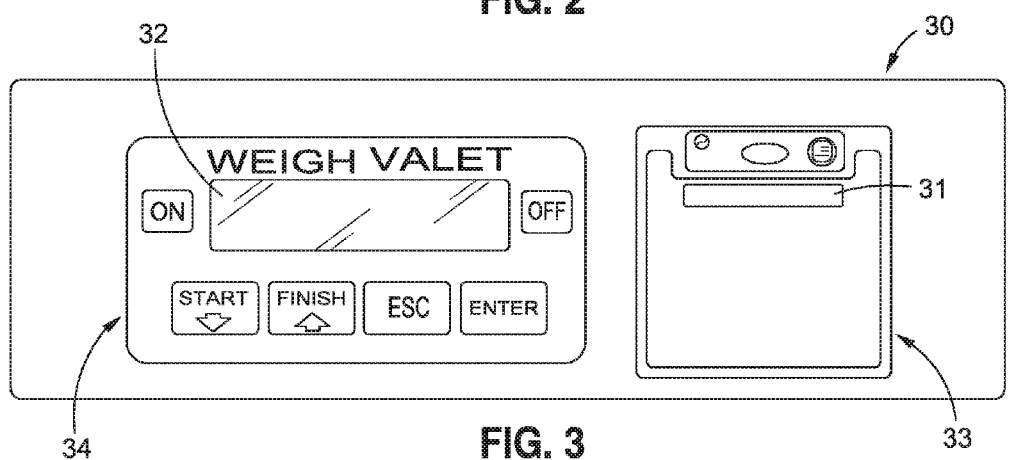
FIG. 3 is an enlarged, schematic diagram of a user interface in accordance with an embodiment of the present disclosure.

FIG. 3 shows an embodiment of a user interface 30 of the luggage cart weighing apparatus 10. In some embodiments, the user interface 30 includes a display portion 34 and a printer portion 33. The printer portion 34 includes a printer output slot 31. The display portion 34 includes a display screen 32, which may be a liquid crystal display (LCD) type. The display portion 34 may include one or more input devices, indicatory lights, etc. In the embodiment illustrated in FIG. 3, the display portion 34 includes the display screen 32 and a plurality of switches including an "ON" button, "OFF" button, "START" button, "FINISH" button, "ESC"

button, and "ENTER" button. The display portion 34 may additionally, or alternatively, include a touch screen interface. Those skilled in the art will recognize that the display portion 34 may utilize many different configurations of buttons some with additional, fewer, or different buttons than depicted in FIG. 3. In some embodiments, the user interface 30 may include an audio transducer (not shown) that accepts sound input in the form of voice commands, the processing of which may be performed by with a programmable integrated circuit device such as a microcontroller or control processor (e.g., processor 50 shown in FIG. 4.) In some embodiments, the user interface 30 may be configured to connect with computing and/or communications devices (e.g., laptops, tablets, ultrabooks, smart phones, etc.) or other wireless devices.

In some embodiments, as shown for example in FIG. 4, the user interface 30 includes a first printed circuit board (PCB) 53 coupled to the printer portion 34, and a second PCB 54 coupled to the display portion 34. The first PCB 53 may include a first controller 91 that manages the output functionality of the printer portion 33. The second PCB 54 may include a second controller 92 that interfaces with an input/output subsystem that manages the output functionality of the scale display 32 and the input functionality of the "ON" button, the "OFF" button, the "START" button, the "FINISH" button, the "ESC" button, and the "ENTER" button. Those skilled in the art will recognize that the functionality of the printer portion 33 and the display portion 34 may be implemented in one or more electronic components. Depending on the electronic components and circuity required to implement the functionality of the printer portion 33 and the display portion 34, the physical characteristics (e.g., size, shape and thickness) of the first PCB 53 and the second PCB 54 may vary from the configuration depicted in FIG. 4. In other embodiments, a single controller may be utilized to manage the functionality of the printer portion 33 and the functionality of the display portion 34. Those skilled in the art will recognize that the first PCB 53 may be communicatively coupled to the second PCB 54. In other embodiments, the user interface 30 may utilize a single PCB in lieu of the first PCB 53 and the second PCB 54.

In FIGS. 4 and 5, an embodiment of the weighing apparatus 100 is shown and includes the platform 15 and frame members 19 of the hotel bell captain cart 17 (shown in FIGS. 1 and 2). In some embodiments, as shown for example in FIG. 4, the weighing apparatus 100 includes four weight measuring devices 40, a processor 50, and a data processing apparatus 58. The data processing apparatus 58 includes an output connected to the processor 50 via a transmission line 2. The data processing apparatus 58 includes a plurality of inputs, e.g., four inputs connected to the four weight measuring devices 40 via transmission lines 7. In some embodiments, the data processing apparatus 58 may include logic, circuitry and/or code configured to sum the output of the four weight measuring devices 40 and/or to output a signal indicative of the total load applied to the platform 15. In other embodiments, the functionality of the data processing apparatus 58 may be incorporated into the processor 50. In some embodiments, the processor 50 is coupled to the four weight measuring devices 40. A memory (not shown) coupled to the processor 50 may store program instructions and data which the processor 50 may access for executing functions and/or method steps associated with executing a software application of the present disclosure.

In some embodiments, the processor 50 is communicatively coupled to the first controller 91 of the first PCB 53 via a transmission line 3 and communicatively coupled to the second controller 92 of the second PCB 54 via a transmission line 4. In other embodiments, the functionality of the processor 50 may be incorporated into the first controller 91 and/or the second controller 92. Alternatively, the functionality of the first controller 91 and/or the second controller 92 may be incorporated into the processor 50.

In some embodiments, as shown for example in FIG. 4, weighing apparatus 100 includes a wireless network interface 22 communicatively coupled to the processor 50 via a transmission line 5 and wirelessly coupled to a network 202. The wireless network interface 22 may be configured to connect with computing and/or communications devices (e.g., laptops, tablets, ultrabooks, smart phones, etc.) or other wireless devices. The network 202 may include wireless networks, data or packet networks, cable networks, satellite networks, private networks, public networks, cloud networks, or other types of communications networks. Those skilled in the art will recognize that the network 202 may include one or more network devices utilized to enable, initiate, route, and manage content and other communications between one or more networks, connections, or communications devices. For example, the network 202 may include a local area network (LAN), a wide area network (WAN), a metropolitan area network (MAN), a telephone network, such as the public switched telephone network (PSTN) or a cellular network, the Internet, an intranet, an extranet, a private network, other network, or a combination of networks.

The wireless network interface 22 may include logic, circuitry and/or code for communicating information indicating the weight of one or more items loaded onto the platform 15 to a mobile communication device, e.g., a hotel guest's personal computing device 11 or a hotel operator's computing device 13 (shown in FIGS. 2 and 4). In some embodiments, the wireless network interface 22 is used for communicating airline luggage allowance information to the processor 50. The wireless network interface 22 may communicate guest flight reservation information (e.g., airline, flight number, origin and destination airports) from a mobile communication device to the processor 50. In some embodiments, the processor 50 is configured to compare the guest flight reservation information to the airline's luggage allowance information to derive a flight-specific luggage allowance for a specific flight booked by the guest. In some embodiments, the processor 50 is then configured to indicate if the weight of an item loaded onto the platform 15 exceeds the flight specific luggage allowance. The operations performed by the processor 50 may be programmed as instructions that are executed on the processor 50. In this regard, the processor 50 may include an arithmetic/logic unit (ALU), various registers, and input/output ports. An external memory device, e.g., an EEPROM (electrically erasable/programmable read only memory), may be communicatively coupled to the processor 50 for permanent storage and retrieval of program instructions. It is to be understood that an internal random access memory (RAM), or other memory, may additionally, or alternatively, be utilized. The memory may include or be in communication with a cache for buffering write/read requests and their associated data.

In some embodiments, as shown for example in FIGS. 4 and 5, elements of the printer portion 33 and the display portion 34 are coupled to a wall of a housing 60. Various elements of the user interface 30 may be associated with a housing 60. The data processing apparatus 58, the processor 50, and/or the wireless network interface 22 may be contained within the housing 60. In embodiments, the first PCB 53 and the second PCB 54 are coupled to a wall of the housing 60. The housing 60 may include a plurality of socket connectors (not shown) for making electrical connections with plugs associated with the plurality of transmission lines 7. Fasteners, e.g., mounting brackets 8 shown in FIG. 5, may be provided for attaching the housing 60 to the bottom surface 14 of the platform 15. An electrical connector 38 may be associated with the housing 60 and/or the mounting brackets 8. The electrical connector 38 may allow for recharging of a rechargeable battery (not shown) which may be housed within the housing 60. It is to be understood that component parts of the weighing apparatus 100 may be electrically coupled to and powered by any convenient source of electrical power, e.g., an electrical outlet, an onboard, battery or battery pack, etc.

Embodiments of a weighing system in accordance with the present disclosure include the weighing apparatus 100 and a software application configured to request and receive data from transportation providers, e.g., airlines websites, to obtain current information on luggage allowance policies that apply for a traveler's itinerary, e.g., based on operating carrier, origin and destination airports. The software application may include executable instructions loaded onto a hotel operator's computing device 13 (and/or to a hotel guest's personal computing device 11), for accessing data from transportation providers, e.g., luggage allowance information and associated luggage fees, which can then be communicated to the processor 50. That information may vary according to airline, route and/or class of travel, taking into account the number of bags, free allowances, and ever-changing aviation rules. The software application may also include executable instructions of a web browser application that are loaded on a computer in a hotel guest's and/or downloadable to the hotel guest's personal computing device 11 (shown in FIGS. 2 and 4). Additionally, or alternatively, the software application may include executable instructions of a web browser application that are loaded on business center and guest-use lobby PCs and/or other hotel computer(s). The instructions loaded onto the hotel guest's personal computing device 11 may allow the guest to see the weight of the luggage on the luggage cart weighing apparatus 10. The software application may include instructions executable to provide a graphical user interface useful to capture the guest's travel information, e.g., airlines, route, class of travel, and program the processor appropriately. In carrying out the foregoing, a computer readable storage medium having instructions stored thereon may be utilized.

It is to be understood that the dashed lines indicative of electrical connections (e.g., electrical conductors) between various components of the weighing apparatus 100 are merely illustrative and non-limiting examples of electrical connections, and that weighing apparatus embodiments of the present disclosure may utilize many different configurations of electrical connections, some with additional, fewer, or different electrical connections than depicted in FIG. 4. Those skilled in the art will recognize that electrical connections from a power source (not shown) to various components of the weighing apparatus 100 may be formed in a variety of configurations.

In FIGS. 6 and 7, an embodiment of the weight measuring device 40 is shown with the wheel 80 having the plate mount 86. In the embodiment illustrated in FIGS. 6 and 7, the weight measuring device 40 includes a top plate 46, a base plate 44, and a load sensor 45 for sensing weight. The load sensor 45 is operably coupled to both the top plate 46 and the base plate 44. In some embodiments, the load sensor 45 is a strain gauge load cell. The plate mount 86 of the wheel 80 is mounted, affixed, or otherwise securely attached to the base plate 44 of the weight measuring device 40. In some embodiments, as shown for example in FIGS. 6 and 7, an electrically non-conductive, abrasion-resistant material 70 is situated between the plate mount 86 and the base plate 44. In a preferred embodiment, ¼ inch thick Phenolic material is used for the electrically non-conductive, abrasion-resistant material 70. Those skilled in the art will recognize that a variety of electrically non-conductive, abrasion-resistant materials may be utilized. In other embodiments, the plate mount of the wheel 80 and the base plate 44 of the weight measuring device 40 may be machined, welded, bonded, etc.

In some embodiments, as shown for example in FIG. 7, the plate mount 86 and the base plate 44 have four threaded attachment holes configured to receive threaded fasteners 9. In a preferred embodiment, the threaded fasteners 9 are urethane cap threaded fasteners. In other embodiments, the plate mount 86 and the base plate 44 may be joined by weld bonding, adhesives, etc. Threaded fasteners 9, e.g., urethane cap threaded fasteners, may additionally, or alternatively, be used to attach the top plate 46 of the weight measuring device 40 to the platform 15 of the luggage cart weighing apparatus 10. In modular kit embodiments, the weight measuring devices 40 and wheels 80 may be pre-assembled together. It is to be understood that the top plate 46 may be mounted or fixedly secured to the bottom surface 14 of the platform 15 in any suitable manner.

During operation of the luggage cart weighing apparatus 10, one or more pieces of luggage $L_1$ are placed on the first surface 16 of the platform 15 of the hotel bell captain cart 17, e.g., as shown in FIG. 1. Additionally, or alternatively, any hangable items, e.g., garment bags, backpacks and the like, may be supported by one or one of the tubular frame members 19, or features thereof, for weighing of the hangable items by the luggage cart weighing apparatus 10. The weight of the one or more pieces of luggage $L_1$ resting on the platform 15 (and/or items hanging on frame members 19) is sensed by the load sensor 45 of each of one or more weight measuring devices 40.

In some embodiments, one or more electrical output signals from the load sensors 45 are received by the data processing apparatus 58. The data processing apparatus 58 may be configured to output a signal indicative of the sum of the signals received from the four load sensors 45. In some embodiments, one or more electrical output signals from the data processing apparatus 58 are transmitted to a processor 50. Output signals from the processor 50 are received by the first controller 91 of the first PCB 53 and/or the second controller 92 of the second PCB 54.

The measured weight of the weighed pieces of luggage $L_1$ on the platform 15 (and/or items hanging on frame members 19) may be displayed on a display screen 34, e.g., in response to user activation of one or more switches included in the display portion 34 of the user interface 30. Additionally, or alternatively, the measured weight of the weighed pieces of luggage $L_1$ resting on the platform 15 (and/or items hanging on frame members 19) may be printed on a slip of paper and dispensed from the printer output slot 31, e.g., in response to user activation of one or more switches included in the printer portion 33 of the user interface 30.

In some embodiments, a traveler may enter information into a software application available on a computer in a hotel room (or a computer in a hotel business center, lobby, etc.) and/or downloadable to the traveler's personal computing device 11. The measured weight of the weighed pieces of luggage $L_1$ on the platform 15 (and/or items hanging on frame members 19) may be input into the software application. The software application may include instructions executable to generate a notification, e.g., text message and/or email, which is transmitted to the traveler's personal computing device 11. The text message and/or email may inform the traveler regarding compliance (or non-compliance) of the traveler's luggage with weight restrictions.

Although embodiments have been described in detail with reference to the accompanying drawings for the purpose of illustration and description, it is to be understood that the disclosed processes and systems are not to be construed as limited thereby. It will be apparent to those of ordinary skill in the art that various modifications to the foregoing embodiments may be made without departing from the scope of the disclosure.

What is claimed is:

1. A luggage cart weighing apparatus, the apparatus comprising:
   a luggage platform;
   a plurality of wheels for supporting the platform;
   at least one weight measuring device disposed intermediate the platform and at least one wheel of the plurality of wheels;
   a user interface disposed adjacent the platform, the user interface being in electrical communication with the at least one weight measuring device for providing information concerning a weight of one or more items loaded onto the platform;
   wherein the at least one weight measuring device comprises a plurality of weight measuring devices, each weight measuring device being in electrical communication with the user interface and disposed intermediate the platform and an associated one of the wheels;
   a processor in communication with the plurality of weight measuring devices and the user interface; and
   a local wireless communication circuit in communication with the processor, for communicating information indicating the weight of items loaded onto the platform to a mobile communication device.

2. The luggage cart weighing apparatus of claim 1, wherein the weight measuring devices are strain gauge load cells.

3. The luggage cart weighing apparatus of claim 2, wherein the strain gauge load cells are configured to have matched load output characteristics.

4. The luggage cart weighing apparatus of claim 1, wherein the user interface includes a display for indicating the weight of items loaded onto the platform.

5. The luggage cart weighing apparatus of claim 1, wherein the user interface includes a printer for printing information concerning the weight of items loaded onto the platform.

6. A luggage cart weighing apparatus, the apparatus comprising:
   a luggage platform;
   a plurality of wheels for supporting the platform;
   at least one weight measuring device disposed intermediate the platform and at least one wheel of the plurality of wheels;
   a user interface disposed adjacent the platform, the user interface being in electrical communication with the at least one weight measuring device for providing information concerning a weight of one or more items loaded onto the platform;
   wherein the at least one weight measuring device comprises a plurality of weight measuring devices, each weight measuring device being in electrical communication with the user interface and disposed intermediate the platform and an associated one of the wheels;
   a processor in communication with the plurality of weight measuring devices and the user interface; and
   a local wireless communication circuit, in communication with the processor, for communicating airline luggage allowance information to the processor.

7. The luggage cart weighing apparatus of claim 6, wherein the local wireless communication circuit further communicates guest flight reservation information from a mobile communication device to the processor.

8. The luggage cart weighing apparatus of claim 7, wherein the processor is operative to compare the guest flight reservation information to the airline luggage allowance information to derive a flight specific luggage allowance for a specific flight booked by a guest.

9. The luggage cart weighing apparatus of claim 8, wherein the processor is further operative to indicate if the weight of an item loaded onto the platform exceeds the flight specific luggage allowance.

10. The luggage cart weighing apparatus of claim 1, further comprising: a summing circuit having a plurality of inputs, each input being in electrical communication with an associated weight measuring device, and an output connected to the processor.

11. The luggage cart weighing apparatus of claim 10, wherein the summing circuit is configured to output a signal indicative of the total load applied to the platform.

12. The luggage cart weighing apparatus of claim 1, wherein the luggage cart further includes a plurality of tubular frame members mechanically connected to and extending upwardly from the platform.

13. A luggage cart weighing apparatus, the apparatus comprising:
   a luggage platform;
   a plurality of wheels for supporting the platform;
   at least one weight measuring device disposed intermediate the platform and at least one wheel of the plurality of wheels; and
   a user interface disposed adjacent the platform, the user interface being in electrical communication with the at least one weight measuring device for providing information concerning a weight of one or more items loaded onto the platform; and
   wherein the at least one weight measuring device includes a top plate, a base plate, and a load sensor operably coupled to both the top plate and the base plate.

14. The luggage cart weighing apparatus of claim 13, wherein each wheel includes a wheel plate, and wherein an electrically non-conductive, abrasion-resistant material is situated between the base plate of the at least one weight measuring device and the wheel plate.

15. A luggage cart weighing apparatus, comprising:
   a platform, wherein the platform includes a first surface and a second surface in opposed relation to one another;
   a plurality of tubular frame members extending upwardly from the first surface of the platform;
   a plurality of weight measuring devices, each weight measuring device including a top plate, a base plate, and a load sensor operably coupled to both the top plate and the base plate, wherein the top plate of each weight measuring device is attached to the second surface of the platform;
   a plurality of wheels connected to and supporting the platform, wherein each wheel includes a wheel plate, wherein each of the plurality of wheels is attached to an associated weight measuring device base plate; and a user interface disposed adjacent the second surface of the platform for providing information concerning a weight of luggage loaded onto the first surface of the platform, wherein the user interface is communicatively coupled with the plurality of weight measuring devices.

16. The luggage cart weighing apparatus of claim 15, wherein the load sensor is a strain gauge load cell.

17. The luggage cart weighing apparatus of claim 15, wherein an electrically non-conductive, abrasion-resistant material is situated between the wheel plate and the base plate.

18. The luggage cart weighing apparatus of claim 1, wherein the local wireless communication circuit further communicates airline luggage allowance information to the processor.

19. The luggage cart weighing apparatus of claim 15, further comprising a processor in communication with the plurality of weight measuring devices and the user interface.

20. The luggage cart weighing apparatus of claim 19, further comprising a local wireless communication circuit in communication with the processor, for communicating information indicating the weight of items loaded onto the platform to a mobile communication device.

21. The luggage cart weighing apparatus of claim 19, further comprising a local wireless communication circuit, in communication with the processor, for communicating airline luggage allowance information to the processor.

22. A luggage cart weighing apparatus, the apparatus comprising:

a luggage platform;

a plurality of wheels for supporting the platform;

at least one weight measuring device disposed intermediate the platform and at least one wheel of the plurality of wheels;

wherein the at least one weight measuring device is disposed intermediate the platform and associated to one of the wheels;

a processor in communication with at least one measuring device; and a local wireless communication circuit in communication with the processor, for communicating information indicating the weight of items loaded onto the platform to a mobile communication device.

23. A luggage cart weighing apparatus, the apparatus comprising:

a luggage platform;

a plurality of wheels for supporting the platform;

at least one weight measuring device disposed intermediate the platform and at least one wheel of the plurality of wheels;

wherein the at least one weight measuring device is disposed intermediate the platform and associated to one of the wheels;

a processor in communication with at least one measuring device; and a local wireless communication circuit, in communication with the processor, for communicating airline luggage allowance information to the processor.

* * * * *